United States Patent
Klemmer

(10) Patent No.: US 7,359,680 B2
(45) Date of Patent: Apr. 15, 2008

(54) DELAY CALIBRATION IN POLAR MODULATION TRANSMITTERS

(75) Inventor: Nikolaus Klemmer, Cary, NC (US)

(73) Assignee: Telefonaktiebolaget LM Ericsson (publ) (SE)

( * ) Notice: Subject to any disclaimer, the term of this patent is extended or adjusted under 35 U.S.C. 154(b) by 590 days.

(21) Appl. No.: 10/940,880

(22) Filed: Sep. 14, 2004

(65) Prior Publication Data

US 2006/0057976 A1    Mar. 16, 2006

(51) Int. Cl.
H04B 1/02    (2006.01)
(52) U.S. Cl. ............... 455/102; 455/108; 455/110; 455/205; 375/296; 375/297; 330/136; 330/149; 330/151
(58) Field of Classification Search ............... 455/501, 455/127.1, 108, 1, 126, 150.1, 192.1, 102, 455/205, 110, 115.1; 375/345, 376, 296, 375/130, 259, 298, 300, 297, 278, 285, 371, 375/373, 375, 295–302; 330/136, 149, 151
See application file for complete search history.

(56) References Cited

U.S. PATENT DOCUMENTS

| | | | |
|---|---|---|---|
| 4,481,672 A | 11/1984 | Watkinson | |
| 4,491,808 A | 1/1985 | Saito | |
| 6,101,224 A | 8/2000 | Lindoff et al. | |
| 6,366,177 B1 | 4/2002 | McCune et al. | |
| 6,445,249 B1 | 9/2002 | Khan et al. | |
| 6,621,876 B2 * | 9/2003 | Camp et al. | 375/296 |
| 6,653,909 B2 | 11/2003 | Nielsen | |
| 6,701,134 B1 | 3/2004 | Epperson | |
| 6,701,138 B2 | 3/2004 | Epperson et al. | |
| 6,731,694 B2 | 5/2004 | Bozeki et al. | |
| 6,834,084 B2 * | 12/2004 | Hietala | 375/296 |
| 6,937,668 B2 * | 8/2005 | Sridharan et al. | 375/296 |

(Continued)

FOREIGN PATENT DOCUMENTS

EP    1089428 A2    12/1999

(Continued)

OTHER PUBLICATIONS

Hadjichristos, Aristotele. "Transmit Architecture and Power Control Schemes for Low Cost Highly Integrated Transceivers for SGM/EDGE Applications." IEEE International Symposium on Circuits and Systems. IEEE Standard Office, Jan. 2003, pp. III-610 to III-613. ISBN: 0780377613.

(Continued)

*Primary Examiner*—Edward F. Urban
*Assistant Examiner*—Junpeng Chen
(74) *Attorney, Agent, or Firm*—Coats & Bennett, P.L.L.C.

(57) ABSTRACT

A method and apparatus for dynamically compensating for delay mismatch between a supply signal and an input signal of a power amplifier in polar modulation transmitters. One exemplary polar modulation transmitter according to the present invention comprises a power amplifier, a phase modulator, a regulator, a delay tracking circuit, and a delay circuit. The phase modulator derives the amplifier input signal responsive to one or more phase signals, while the regulator derives the amplifier supply signal responsive to an amplitude signal. Based on the amplitude signal and the amplifier supply signal, the delay tracking circuit tracks an observed amplitude path delay. The delay circuit adjusts a path delay associated with the phase signal, responsive to the observed amplitude path delay, to compensate for the delay mismatch.

20 Claims, 13 Drawing Sheets

U.S. PATENT DOCUMENTS

| | | | |
|---|---|---|---|
| 7,023,897 B2* | 4/2006 | Kurihara | 375/130 |
| 7,035,600 B2* | 4/2006 | Duello et al. | 455/108 |
| 7,068,984 B2* | 6/2006 | Mathe et al. | 455/126 |
| 7,072,421 B2* | 7/2006 | Bengtsson et al. | 375/298 |
| 7,072,626 B2* | 7/2006 | Hadjichristos | 455/126 |
| 2002/0058486 A1* | 5/2002 | Persson | 455/150.1 |
| 2002/0141510 A1* | 10/2002 | Sridharan et al. | 375/300 |
| 2002/0193085 A1* | 12/2002 | Mathe et al. | 455/126 |
| 2002/0196864 A1 | 12/2002 | Booth et al. | |
| 2003/0118143 A1 | 6/2003 | Bellaouar et al. | |
| 2003/0201834 A1 | 10/2003 | Pehlke | |
| 2003/0206056 A1 | 11/2003 | Hietala | |
| 2003/0215026 A1 | 11/2003 | Hietala | |
| 2003/0223510 A1 | 12/2003 | Kurakami et al. | |
| 2004/0061555 A1 | 4/2004 | Lynch | |
| 2004/0080364 A1 | 4/2004 | Sander et al. | |
| 2004/0087285 A1 | 5/2004 | Black et al. | |
| 2004/0132470 A1* | 7/2004 | Checoury et al. | 455/501 |
| 2005/0047532 A1* | 3/2005 | Servilio et al. | 375/345 |
| 2005/0100105 A1* | 5/2005 | Jensen | 375/259 |
| 2005/0175135 A1* | 8/2005 | Dosaka | 375/376 |
| 2005/0215209 A1* | 9/2005 | Tanabe et al. | 455/127.1 |
| 2006/0009169 A1* | 1/2006 | Arayashiki | 455/108 |
| 2006/0068697 A1* | 3/2006 | Tanabe et al. | 455/1 |

FOREIGN PATENT DOCUMENTS

| | | |
|---|---|---|
| EP | 1225690 A2 | 12/2001 |
| EP | 1170915 | 1/2002 |
| EP | 1170915 A1 | 1/2002 |
| EP | 1335498 A2 | 1/2003 |
| FR | 2839596 | 11/2003 |
| WO | WO 01/24356 | 4/2001 |
| WO | WO 03/036894 | 5/2003 |
| WO | WO 03/051011 | 6/2003 |
| WO | WO 03/100978 | 12/2003 |
| WO | WO 03/103162 | 12/2003 |
| WO | WO 2004/034603 | 4/2004 |
| WO | WO 2004/034606 | 4/2004 |
| WO | WO 2004/034606 A2 | 4/2004 |

OTHER PUBLICATIONS

Ashkan Mashhour, "Understanding Offset 8-PSK Modulation for GSM Edge," *Microwave Journal*, Oct. 1999.

Powerwave technologies, "GSM and EDGE Single Channel Power Amplifiers," Technical Paper SCPA-MH/JK09-02, 2002, 4 pages.

Behzad Razavi, "Challenges in the Design of High-Speed Clock and Data Recovery Circuits," *IEEE Communications Magazine*, Aug. 2002, pp. 94-101.

Kambiz C. Zangi, "Physical Layer of EDGE," IEEE VTC2000-Fall/Sep. 25, Boston, MA, Sep. 24-28, 2000, 22 pages.

Jae-Wook Lee, Cheon-O Lee, Woo-Young Choi, "A Giga-b/s CMOS Clock and Data Recovery Circuit with a Novel Adaptive Phase Detector," *IEICE Trans. Commun.*, vol. E86-B, No. 7, Jul. 2003, pp. 2186-2189.

E. McCune and W. Sander, "Edge Transmitter Alternative Using Nonlinear Polar Modulation," Proceedings of the 2003 IEEE International Symposium on Circuits and Systems (ISCAS), May 25-28, 2003, vol. 3., pp. 594-597.

W. Sander, S. Schell, and B. Sander, "Polar Modulator for Multi-mode Cell Phones," Proceedings of the 2003 IEEE Custom Integrated Circuits Conference, Sep. 21-24, 2003, pp. 439-445.

* cited by examiner

A SHIFTED VS. B

A INSIDE/OUTSIDE B

A /B MISSING PULSE

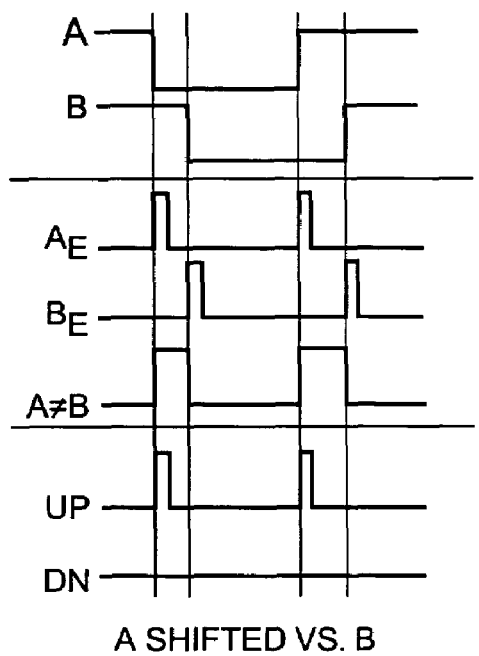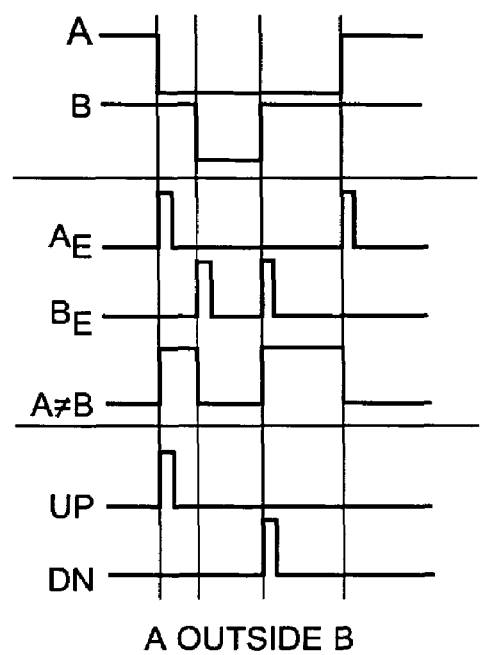
A SHIFTED VS. B
A OUTSIDE B
FIG. 12A
FIG. 12B

DELAY CALIBRATION IN POLAR MODULATION TRANSMITTERS

BACKGROUND OF THE INVENTION

The present invention relates generally to polar modulation transmitters, and more particularly to dynamic compensation for delay mismatch between amplitude and phase signals of polar modulation transmitters.

Due to packet switched data traffic and the need for increased data rates for wide-area wireless connections, a GPRS (General Packet Radio Service) standard was developed to enable transmission of packet data using existing GSM (Global System for Mobile communication) networks. As a result, GPRS mobile terminals may continue to use the relatively constant-envelope transmitter chains typically used for GSM. In addition, to obtain higher bit-rates for EDGE (Enhanced Data rates for GSM Evolution) service, the modulation format was changed from GMSK (Gaussian pre-filtered Minimum Shift Keying) to the more bandwidth efficient $(3\pi/8)$-8PSK (8-ary Phase Shift Keying with $3\pi/8$ symbol-to-symbol phase rotation) with a pre-filtering function that enables the spectral properties of the transmit waveform to remain largely unchanged.

Cartesian modulation transmitters and polar modulation transmitters are conventionally used to implement the desired modulation format. Cartesian modulation transmitters generate In-phase (I) and Quadrature-phase (Q) signals that are valid and complete baseband representations of the transmit waveforms. Such signals may be jointly translated directly to a radio frequency (RF) carrier (i.e. the desired transmit channel) by e.g. commonly used linear-IQ up-conversion transmitters.

In the case of a polar modulation transmitter, a Cartesian-to-Polar converter may transform the Cartesian I and Q coordinates into polar coordinates according to Equation (1):

$$Tx(t)=I(t)+i*Q(t)=R(t)*e^{j\Theta(t)} \quad (1)$$

where $R(t)$ represents an amplitude signal comprising the momentary amplitude of the transmit waveform (the envelope of the RF transmit signal), and $\Theta(t)$ represents a constant-envelope IQ phase signal. Because the amplitude and phase are now separate components, the polar modulation transmitter may advantageously superimpose amplitude and phase modulation onto the RF carrier independently.

Polar modulation transmitters are characterized by the fact that in at least the analog portion of the transmitter circuitry, the to-be-transmitted signals are represented as amplitude and phase signals. Because the amplitude and phase signals travel different paths in the transmitter circuitry, the amplitude and phase signals may experience different path delays. As a result, there may be a delay mismatch between the amplitude and phase signals at the power amplifier, the point where the phase and amplitude signals are recombined.

Delay mismatch may degrade the Adjacent Channel Power Ratio (ACPR). According to current standards, an ACPR less than or equal to −54 dB at 400 kHz and less than or equal to −60 dB at 600 kHz is required. The ideal spectrum (see FIG. 2) meets these requirements with margin. Further evaluation of the ACPR at the EDGE specification frequencies 400 kHz (ACPR$\leq$−54 dB) and 600 kHz (ACPR$\leq$−60 dB) shows that a delay mismatch between the phase and amplitude waveforms of up to 2% of the symbol time may be tolerated. However, when the delay mismatch exceeds 2%, both ACPR specification requirements are violated. Because conventional polar modulation transmitters typically introduce a delay mismatch of approximately 4%, delay mismatch compensation is necessary to meet current standard requirements.

SUMMARY OF THE INVENTION

The present invention comprises a method and apparatus that dynamically compensates for delay mismatch between a supply signal and an input signal of a power amplifier in a polar modulation transmitter. In one exemplary embodiment, the polar modulation transmitter comprises a power amplifier, a phase modulator, a regulator, a delay tracking circuit, and a delay circuit. The phase modulator derives the amplifier input signal responsive to one or more phase signals, while the regulator derives the amplifier supply signal responsive to an amplitude signal. The delay tracking circuit tracks an amplitude path delay based on an observed delay between the amplifier supply signal and the amplitude signal. Responsive to the observed amplitude path delay, the delay circuit adjusts a path delay associated with the one or more phase signals to compensate for the delay mismatch. The delay circuit is interposed in the phase signal path. The delay tracking circuit generates a control signal to adjust the path delay associated with the one or more phase signals to compensate for the delay mismatch.

BRIEF DESCRIPTION OF THE DRAWINGS

FIGS. 12A and 12B illustrate different signal timing scenarios for the early/late detector of FIGS. 11A and 11B.

DETAILED DESCRIPTION OF THE INVENTION

Figure 1:
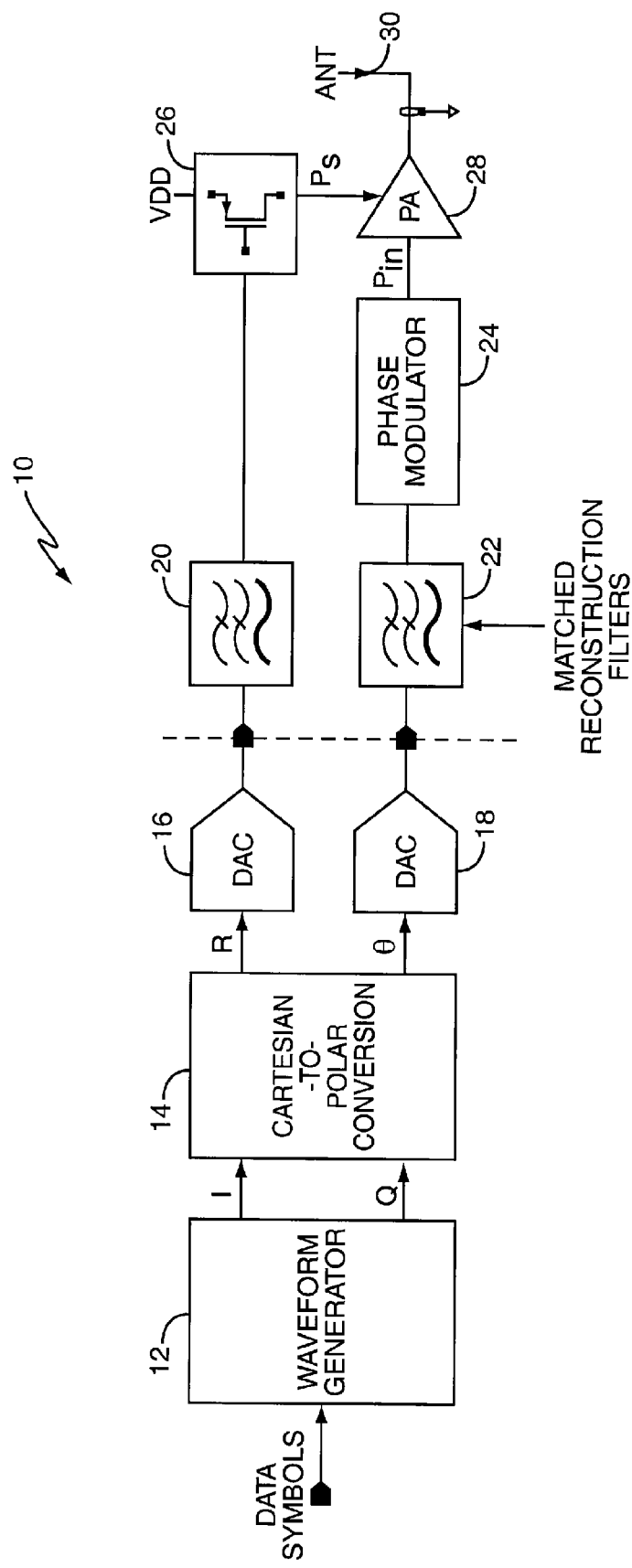
FIG. 1 illustrates a block diagram of a conventional polar modulation transmitter.

FIG. 1 illustrates a block diagram of a conventional polar modulation transmitter 10. Polar modulation transmitter 10 includes a waveform generator 12, Cartesian-to-Polar converter 14, digital-to-analog converters (DACs) 16, 18, filters 20, 22, phase modulator 24, regulator 26, power amplifier 28, and antenna 30. Waveform generator 12 generates in-phase (I) and quadrature-phase (Q) output signals responsive to the data input symbols. Cartesian-to-Polar converter 14 extracts the amplitude of the IQ signals according to Equation (2).

$$R = \sqrt{I^2 + Q^2} \quad (2)$$

Cartesian-to-Polar converter 14 also generates a phase signal $\theta$ that represents the original IQ phase information with constant amplitude according to Equation (3).

$$\theta = \arctan\left(\frac{Q}{I}\right) \quad (3)$$

It will be appreciated by those skilled in the art that phase signal $\theta$ may be separated into I and Q phase components, $\phi_I$ and $\phi_Q$, where Equation (4) shows the relationship between $\theta$ and $\phi_I$ and $\phi_Q$.

$$\phi_I = \cos(\theta)$$

$$\phi_Q = \sin(\theta) \quad (4)$$

For simplicity, the phase signal will be represented herein by $\theta$. However, it will be appreciated that the present invention applies equally well to the I and Q phase components, $\phi_I$ and $\phi_Q$.

DACs 16, 18 convert the digital amplitude and phase signals, respectively, to the analog domain, while reconstruction filters 20, 22 remove aliases and quantization noise from the analog amplitude and phase signals, respectively. Phase modulator 24 superimposes the analog phase signal onto a radio frequency (RF) carrier to provide power amplifier 28 with an amplifier input signal $P_{in}$ according to any known means. The analog amplitude signal R controls the output voltage (or current) of the regulator 26 to provide power amplifier 28 with an amplifier supply signal $P_s$. Typical implementations of regulator 26 include, but are not limited to, linear regulators and switch-mode supply regulators.

Power amplifier 28 amplifies the amplifier input signal $P_{in}$ responsive to the amplifier supply signal $P_s$. In one exemplary embodiment, power amplifier 28 comprises a switching type, e.g., a class C power amplifier, which inherently has low loss properties that approximates the behavior of an ideal switch, given the constraints of available semiconductor and assembly technology. Antenna 30 transmits the resulting signal over a wireless interface according to any means known in the art.

Figure 2:
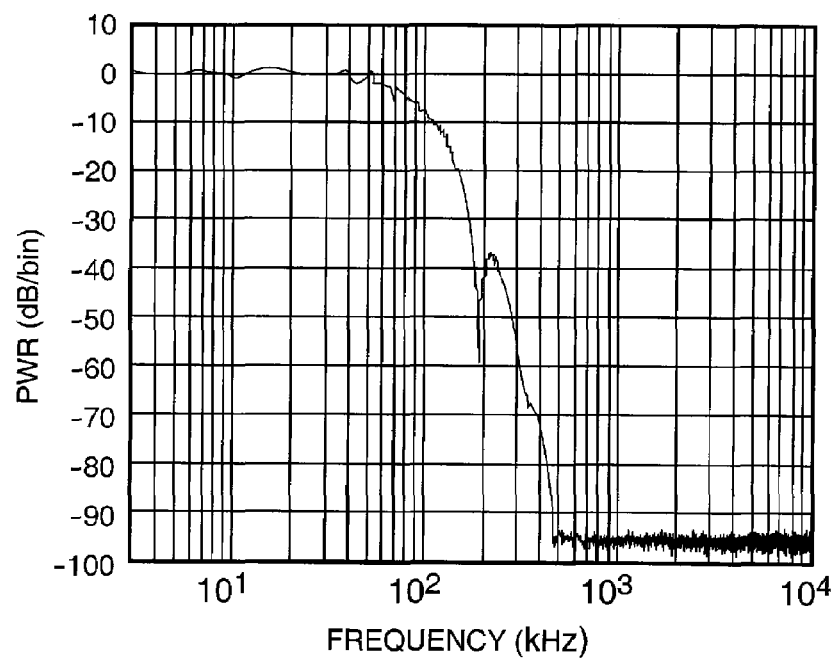
FIG. 2 illustrates a distortion free EDGE modulation spectrum.
Figure 3:
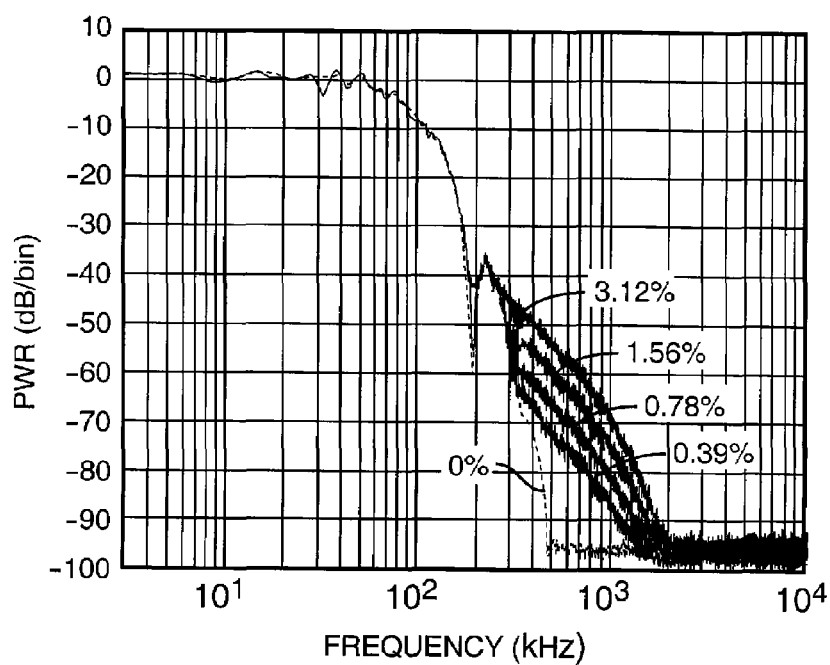
FIG. 3 illustrates the effect of different delay mismatches on the EDGE modulation spectrum.
Figure 4:
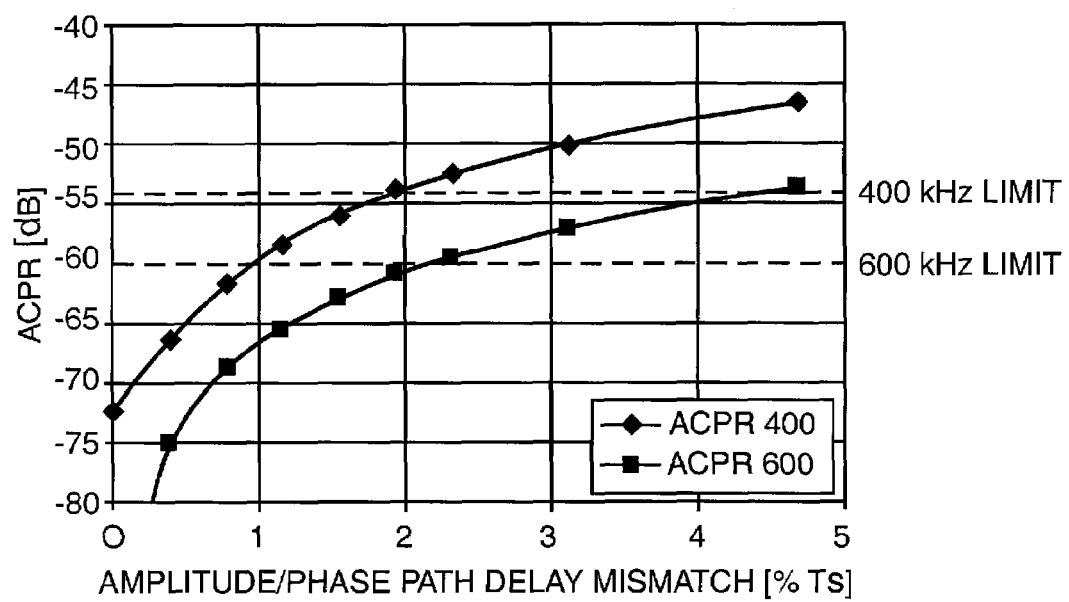
FIG. 4 plots the effect of delay mismatch on ACPR.

Because the RF output amplitude of power amplifier 28 follows the supply voltage linearly, power amplifier 28 uses amplifier supply signal $P_s$ to transfer the baseband amplitude signal R onto the RF carrier as its envelope. Therefore, as long as the amplitude and phase signals have equivalent path delays, along the amplitude and phase paths respectively, power amplifier 28 reproduces the desired transmit spectrum in an ideal manner. As shown in FIG. 2 for the EDGE standard, this ideal transmit spectrum meets the 400 kHz ($\leq$ −54 dB) and 600 kHz ($\leq$ −60 dB) ACPR requirements. However, as shown in FIG. 3, increasing delay mismatch between the amplifier supply signal and the amplifier input signal undesirably increases the ACPR. In particular, FIG. 4 illustrates the relationship between ACPR and delay mismatch. As shown in FIG. 4, the path delay mismatch must be at or below 2% of the symbol period ($T_s$) in order to meet both of the 400 kHz and 600 kHz ACPR requirements.

To better understand the path delay mismatch, the following briefly discusses the source of the mismatch between the delay associated with the amplitude signal path and the delay associated with the phase signal path. First, it will be appreciated that because the Cartesian-to-Polar conversion is done digitally, the delays associated with the phase and amplitude signal paths in the Cartesian-to-Polar converter 14 can be matched perfectly. Further, the delays associated with DACs 16,18 can be matched perfectly by construction, e.g. when assuming a fully digital implementation, such as Delta-Sigma DACs ($\Delta\Sigma$-DACs).

Analog reconstruction filters 20, 22 are typically implemented as on-chip filters that are co-located on the same die as the phase modulator. As a result, filters 20, 22 may share the same physical implementation and layout in both paths, which ensures good path delay matching. It will be appreciated that there is no fundamental limit to the matching accuracy of the delays in these filters 20, 22, but rather practical considerations regarding chip size and power consumption limit the delay matching accuracy. Typical delay mismatch caused by filters 20, 22 may be in the 0.1% $T_s$ range.

Based on the above discussion, it is therefore assumed that the amplitude and phase path delays are approximately matched up to phase modulator 24 and regulator 26. However, because the bandwidth of phase modulator 24 is at least equivalent to the RF carrier frequency (GHz), while the bandwidth of regulator 26 is typically on the order of a few MHz at most, the path delay caused by regulator 26 may be significantly different from the path delay of phase modulator 24. Typically, the delays differ by a factor of 1000. Therefore, the following assumes that regulator 26 causes the majority of the path delay mismatch.

In the case of a switching regulator 26, the sampling nature of the regulator implementation fundamentally limits the output voltage or current modulation bandwidth to the Nyquist frequency, i.e., half the switching frequency. Using currently available technology, switching frequencies are limited to a few (up to ten) MHz. In linear supply regulators 26, the achievable bandwidth in the modulator is limited by the supply decoupling capacitor of the PA and the power consumption in the regulator device. Under realistic assumptions, the bandwidth of linear supply regulators 26 is limited to a few MHz as well. Therefore, assuming an amplitude modulation 3 dB-bandwidth of 1 MHz with a first order frequency response, a path delay for regulator 26 may be approximately 160 ns, which corresponds to 4.3% of the symbol period $T_s$ in EDGE. Therefore, regulator 26 may cause the path delay of the amplitude signal R to differ from the path delay of the phase signal $\theta$ by approximately 4% $T_s$, which is well beyond the 2% limit discussed above.

Figure 5:
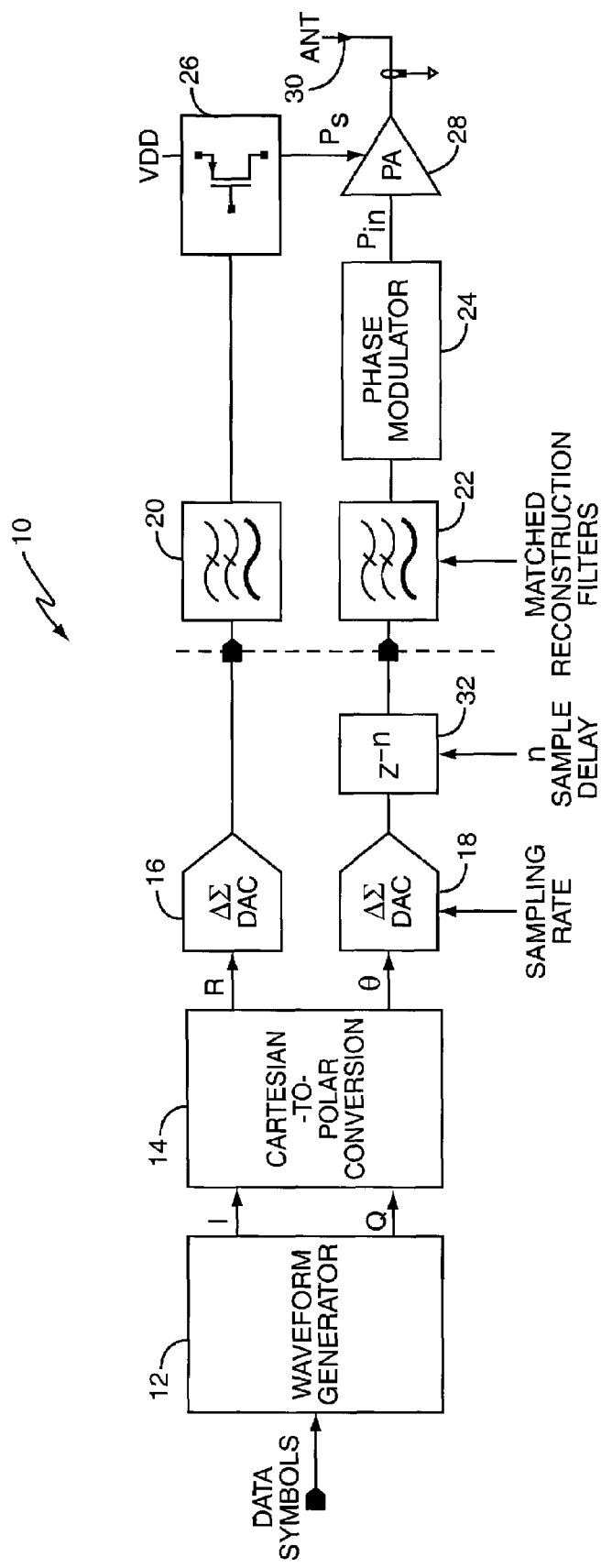
FIG. 5 illustrates a block diagram of a conventional polar modulation transmitter including static delay compensation.

FIG. 5 illustrates a block diagram of a conventional polar modulation transmitter 10 that includes a delay circuit 32 with a fixed n-sample delay to compensate for the delay mismatch. The implementation of FIG. 5 assumes that DACs 16, 18 provide a highly over-sampled digital output signal, such as provided by a single-bit ΔΣ-DAC. The over-sampling rate needs to be high enough such that a delay resolution of substantially less than the required +/−2% $T_s$ is achievable. This means that the sampling rate of DAC 16, 18 needs to be greater than 50-times the symbol rate, which is easily achievable. In fact, sampling rates of 10-times or more the required sampling rate, e.g., 500 times the symbol rate, are commonly used (e.g. 100 MHz).

In the polar modulation transmitter 10 of FIG. 5, delay circuit 32 is a fixed delay circuit 32 that applies a known n-sample delay to the phase signal θ. However, because the delay mismatch is generally unknown a priori, the polar modulation transmitter 10 of FIG. 5 requires a calibration step, at least during the manufacturing of the transmitter 10, to determine the delay adjustment to be provided by delay circuit 32 for some chosen 'nominal' condition. This calibration step mainly eliminates the effect of global processing tolerances in the regulator 26, such as high/low bandwidth at a given operating point.

However, it will be appreciated that polar modulation transmitter 10 does not always operate at the chosen nominal condition. Because delay mismatch between the two paths also depends on the momentary operating and environmental conditions, the delay mismatch varies along with the varying operating and environmental conditions. For example, those skilled in the art understand that the bandwidth of a linear regulator 26 scales roughly proportionally with the load current. Hence, as the output power level of power amplifier 28 changes, the delay of regulator 26 also changes. Furthermore, the bandwidth of the regulator 26 also depends on its operating temperature. As a result, the delay associated with regulator 26 changes over the duration of a connection to a wireless network. Therefore, the fixed delay provided by delay circuit 32 will not always adequately compensate for delay mismatch that varies due to varying operating and environmental conditions.

A more aggressive calibration scheme may alternatively be used to eliminate the one-time factory calibration step, and set the n-samples delay of delay circuit 32 once for a particular design based on a lab characterization of regulator 26. While this eases factory test and calibration time, it also leads to a further softening of the delay mismatch compensation because this approach does not compensate for variations in regulator delay caused by, for example, manufacturing tolerances.

Figure 6:
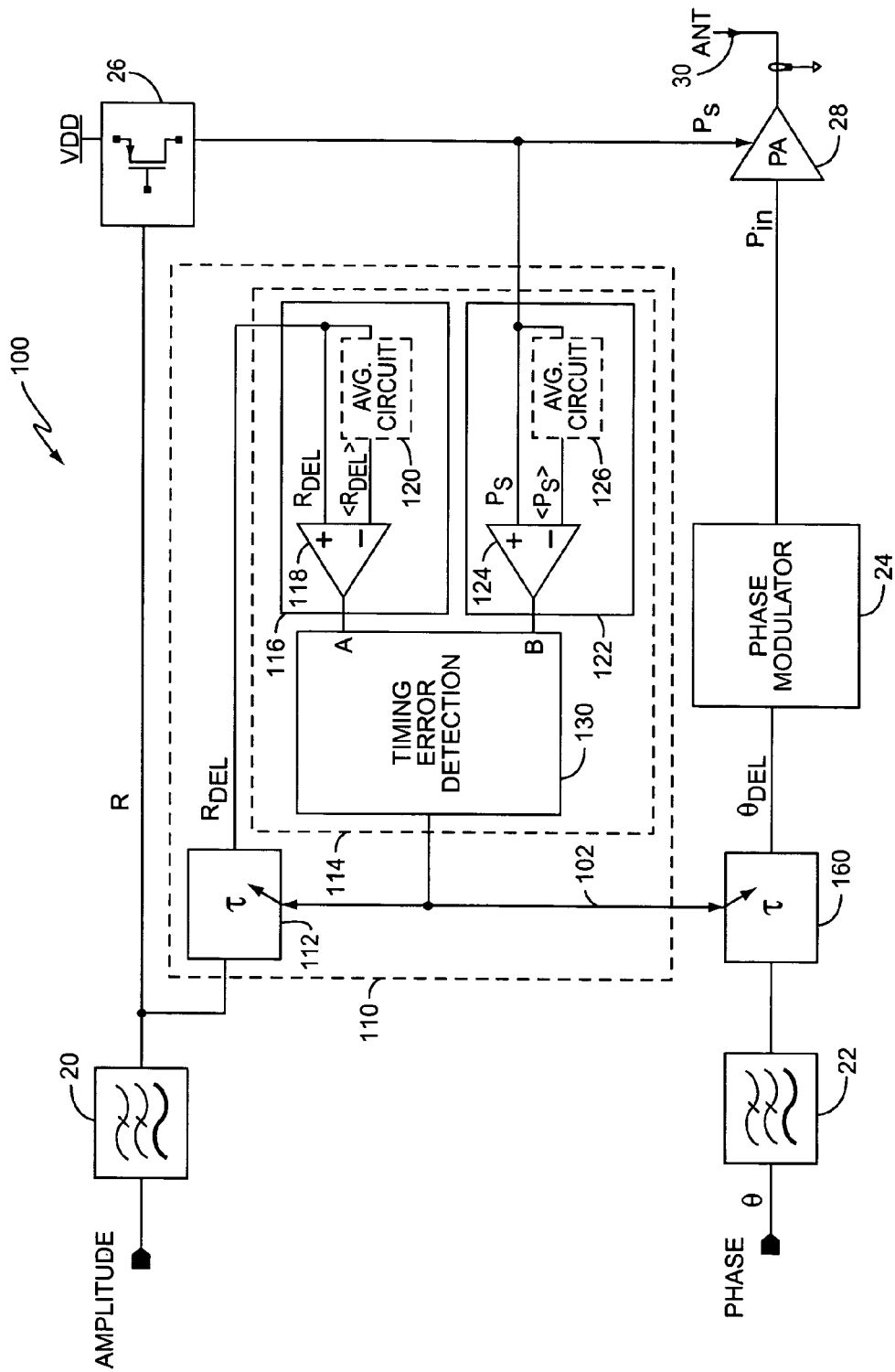
FIG. 6 illustrates a block diagram of one exemplary embodiment of a polar modulation transmitter according to the present invention.

To address these issues, the present invention provides a polar modulation transmitter that dynamically adjusts the delay mismatch between the amplifier input signal and the amplifier supply signal. FIG. 6 illustrates a block diagram of one exemplary polar modulation transmitter 100 according to the present invention. In addition to the filters 20, 22, phase modulator 24, regulator 26, power amplifier 28, and antenna 30 discussed above, the polar modulation transmitter 100 of FIG. 6 includes a delay tracking circuit 110 and a variable delay circuit 160.

According to the present invention, delay tracking circuit 110 tracks an observed delay mismatch between the amplitude signal and the amplifier supply signal using a closed-loop feedback system to determine the path delay of regulator 26. Responsive to tracking the delay mismatch, delay tracking circuit 110 generates a control signal 102. Delay circuit 160 adjusts a path delay associated with phase signal θ responsive to the control signal 102 to compensate for the delay mismatch between the amplifier input signal and the amplifier supply signal.

Figure 10:
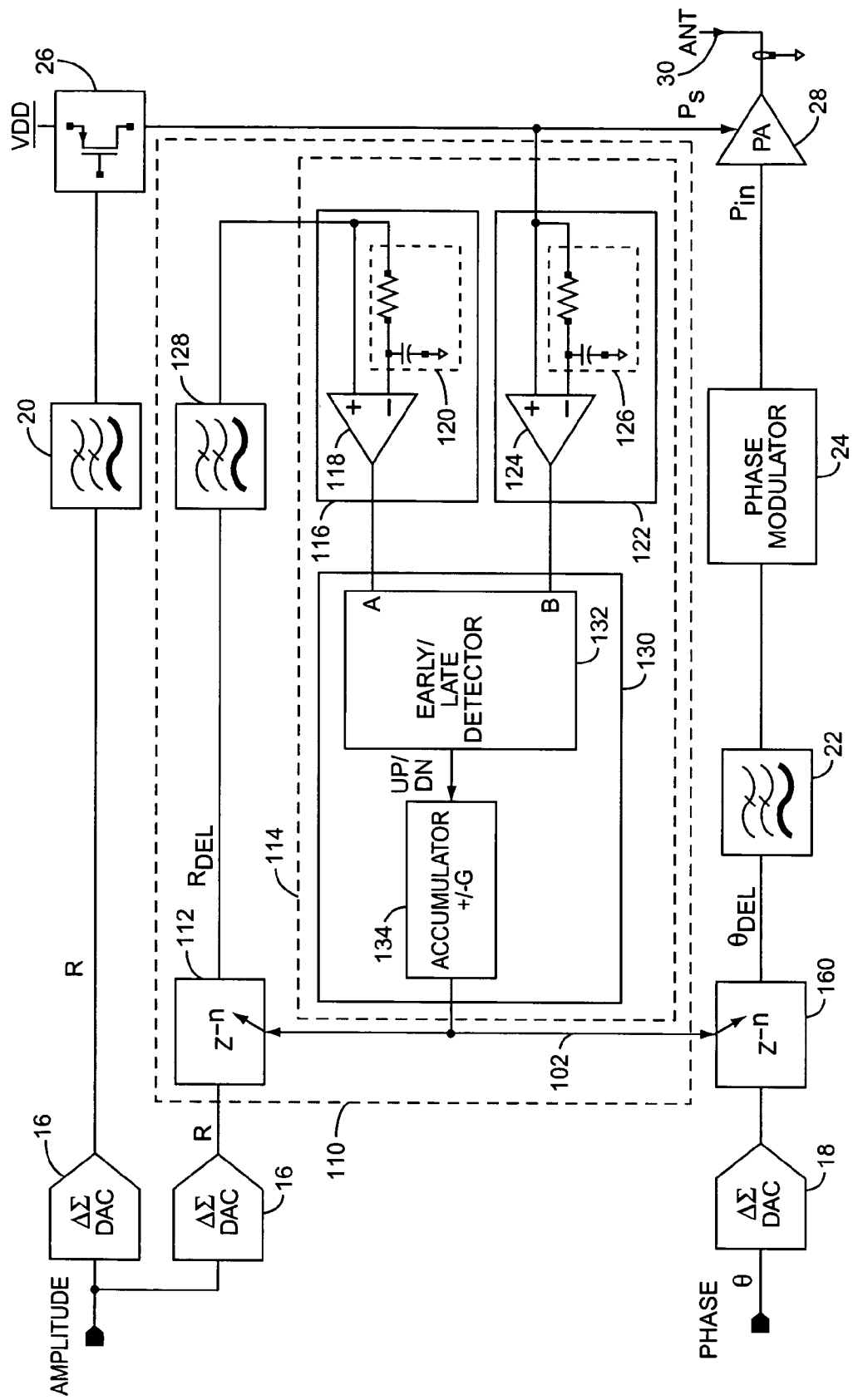
FIG. 10 illustrates a block diagram of another exemplary polar modulation transmitter according to the present invention.

In one exemplary embodiment, delay tracking circuit 110 comprises a variable delay circuit 112 and a delay processor 114. Variable delay circuit 112 applies an observed path delay to a portion of the amplitude signal R to generate a delayed amplitude signal $R_{DEL}$. Using the delayed amplitude signal $R_{DEL}$ and the amplifier supply signal $P_s$, delay processor 114 determines control signal 102. To prevent the closed-loop system from being sensitive to the gain of regulator 26, two pulse-trains are generated and processed by delay processor 114 to determine the control signal 102. To that end, one exemplary delay processor 114 comprises an amplitude signal timing circuit 116, a supply signal timing circuit 122, and a timing error detector 130. A comparator 118 in amplitude signal timing circuit 116 provides an amplitude timing indicator signal A by comparing the delayed amplitude signal $R_{DEL}$ to a time average of the delayed amplitude signal <$R_{DEL}$> generated by an averaging circuit 120. Similarly, a comparator 124 in supply signal timing circuit 122 provides a supply timing indicator signal B by comparing the amplifier supply signal $P_s$ to a time average of the amplifier supply signal <$P_S$> generated by averaging circuit 126. Averaging circuit 120, 126 may comprise any known averaging circuit. For example, as shown in FIG. 10, averaging circuit 120, 126 may comprise a first order RC lowpass filter.

Figure 7:
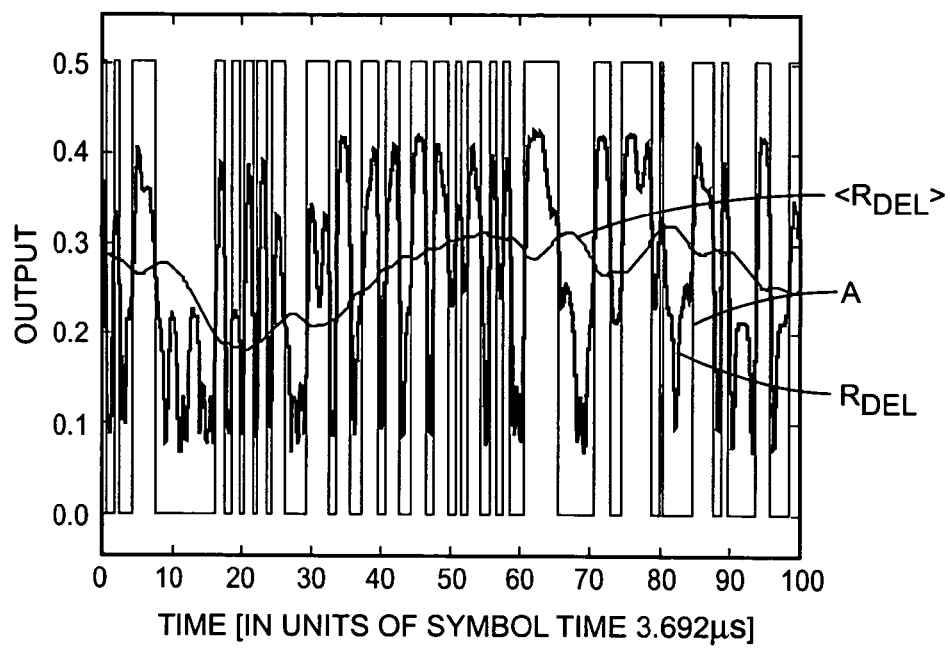
FIG. 7 illustrates various signals associated with the exemplary polar modulation transmitter of FIG. 6.

FIG. 7 illustrates exemplary input signals ($R_{DEL}$, <$R_{DEL}$>) and amplitude timing indicator signal A for the amplitude signal timing circuit 116. As shown in FIG. 7, comparator 118 compares $R_{DEL}$ with <$R_{DEL}$> to generate the ideal comparator output, amplitude timing indicator signal A. It will be appreciated that the supply signal timing circuit 122 compares $P_s$ with <$P_S$> to generate a similar comparator output, supply timing indicator signal B for the supply signal timing circuit 122.

Figure 8:
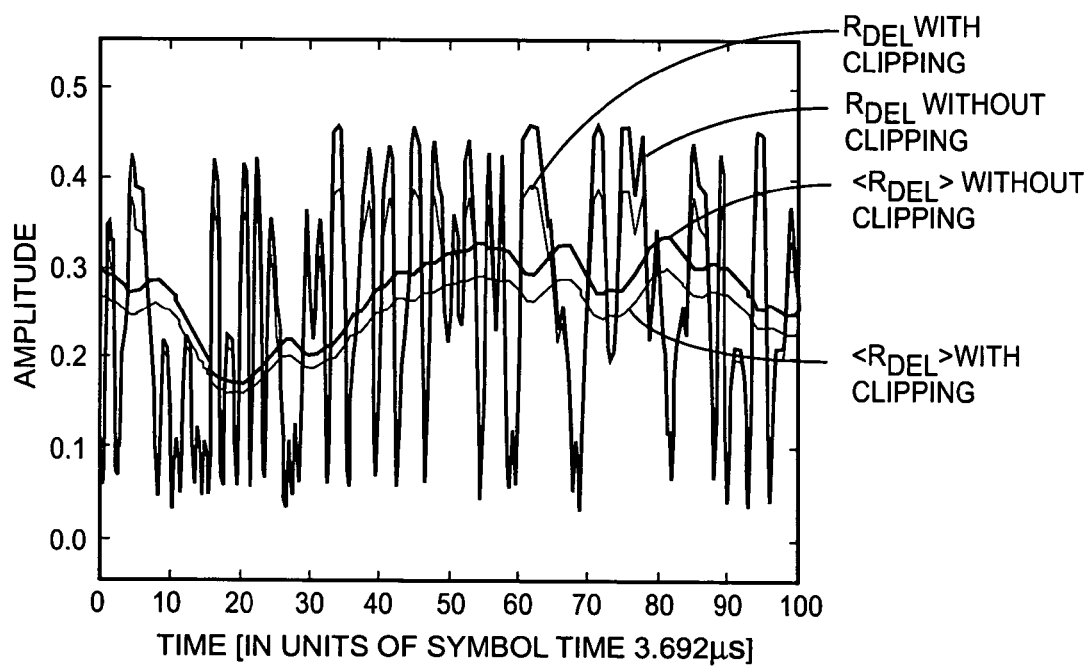
FIG. 8 illustrates the effects of soft clipping on the signals of FIG. 7.

It will be appreciated that while FIG. 7 shows an ideal comparator output, in practice, comparators 118, 124 generate outputs as shown in FIG. 8. Instead, because regulator 26 typically exhibits some nonlinearities due to the onset of clipping that often occurs at high output power levels necessary for higher amplifier efficiency, the output of the comparators 118, 124 typically exhibits clipping distortion. The effects of this clipping along with a 2% delay mismatch are shown in FIG. 8. However, as discussed below, the dynamic delay mismatch compensation provided by the present invention is sufficient to overcome the effects of the clipping distortion.

In any event, timing error detector 130 detects the time misalignment or delay error between the amplitude timing indicator signal A and the supply timing indicator signal B and generates a control signal 102 responsive to the detected time misalignment. Control signal 102 is applied to both the variable delay circuit 112 of delay tracking circuit 110 and the delay circuit 160 in the phase signal path. In so doing, control signal 102 defines the compensation delay for the phase path by matching the compensation delay added to the phase path by delay circuit 160 to the estimated delay mismatch between the amplitude signal and the amplifier supply signal determined by delay tracking circuit 110.

Figure 9A:
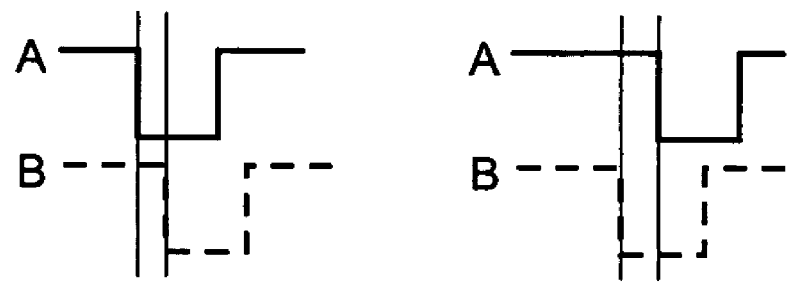
FIGS. 9A, 9B, and 9C illustrate various timing error detector input signal waveform scenarios.
Figure 9B:
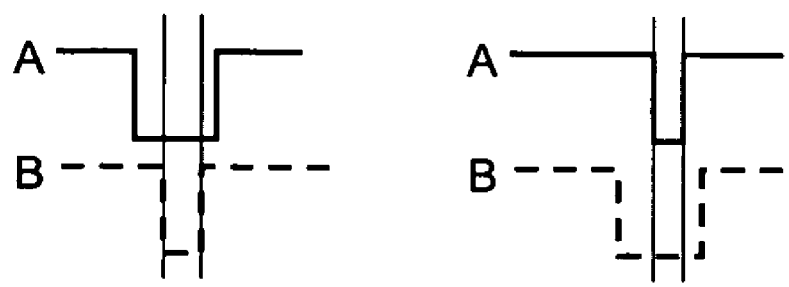
Figure 9C:
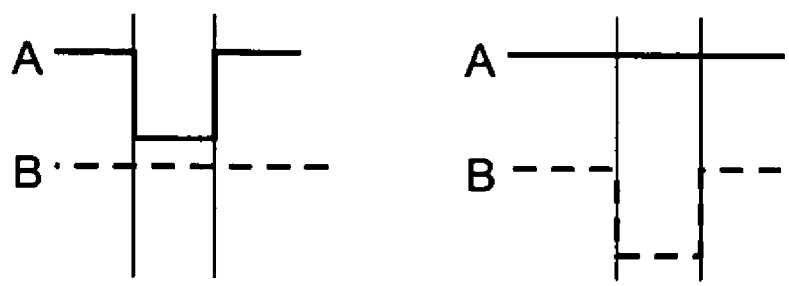

Turning now to FIGS. 9A-9C, the general operation of timing error detector 130 will be discussed for different input scenarios. There are three basic scenarios that may occur at the input to the Timing-Error-Detector 130. In the first scenario, signals A and B are early/late with respect to each other (FIG. 9A). In this case, the timing error detector 130 issues a control signal 102 to the delay circuits 112, 160 to systematically increase/decrease the delay mismatch over time.

In a second scenario, signal A (B) has two edges within two corresponding edges of signal B (A) (FIG. 9B). This case occurs as a consequence of the clipping distortion mentioned above and/or due to unavoidable comparator input offsets, i.e., shifts of the comparison threshold differential voltage away from nominal zero. In this situation, timing error detector 130 may issue a control signal 102 that is proportional to the "centered-ness" of one signal with respect to the other. In an approximate implementation, timing error detector 130 will issue a net zero correction, essentially assuming timing alignment for this scenario.

In a third scenario, signal A (B) has transition edges while the corresponding signal B (A) does not change state (FIG. 9C). This "missing edge" scenario can occur due to comparator offsets and/or ambiguities that lead one comparator 118, 122 to issue a narrow pulse as a result of a small differential input voltage while the other comparator 118, 122 did not detect a crossing of the actual signal and it's moving average. In this case, the timing error detector 130 may issue a control signal 102 to the delay circuits 112, 160 to decrease/increase the delay, as discussed further below. As a result, the delay mismatch will be incorrectly adjusted. Typically, a future compensation cycle will correct the compensation error caused by this scenario.

The above describes a general implementation of the present invention that uses a delay tracking circuit 110 to track the delay mismatch between the amplitude signal R and the amplifier supply signal $P_s$. It will be appreciated that there may be many ways to track this delay mismatch. Therefore, the present invention is not limited to the specific embodiments discussed further below.

FIG. 10 illustrates a block diagram of one exemplary delay processor 114 of delay tracking circuit 110 according to the present invention that, in addition to the amplitude signal timing circuit 116 and the supply signal timing circuit 122, comprises an early/late detector 132, an accumulator 134, and a filter 128. Filter 128 mimics the filtering operation of filters 20, 22 to impart a delay on $R_{DEL}$ equivalent to the delay imparted to the amplitude signal R by filters 20, 22.

Early/late detector 132 may comprise any detector capable of determining the relative transition timing between signal A and signal B. Generally, when signals A and B are unequal, edge early/late detector 132 becomes active. Based on the relative transition relationship between signals A and B, early/late detector 132 generates a delay error signal. For example, when A transitions before B, the delay error signal corresponds to an output at the UP terminal. However, when B transitions before A, the delay error signal corresponds to an output at the DN terminal. In response to an UP output, accumulator 134 increases the delay by adding an increment G to the previous delays stored in the accumulator 134, where G is a fixed number. Similarly, in response to a DN output, accumulator 134 decreases the delay by subtracting G from the previous delay stored in accumulator 134.

Accumulator 134 may comprise any known accumulator, combining circuit, or up/down converter that accumulates the number of DAC samples necessary to time-align the delayed amplitude signal $R_{DEL}$ with the amplifier supply signal $P_s$. The accuracy of this alignment is typically to within +/−½ DAC sampling period $T_s$. In practice, assuming a 100 MHz DAC sampling clock frequency, the accuracy of this alignment is within 0.25%.

In any event, responsive to the delay error signal generated by the early/late detector 132, accumulator 134 provides the accumulated delay to variable delay circuit 112 to generate the delayed amplitude signal $R_{DEL}$. In so doing, variable delay circuit 112 modifies the delay applied to the amplitude signal R so that delay processor 114 may continue to track the delay mismatch between the amplitude signal R and the amplifier input signal $P_s$. Further, responsive to the accumulator output signal 102, a variable phase path delay circuit 160 delays the phase signal θ to generate the delayed phase signal $θ_{DEL}$ to compensate for the delay mismatch between the amplitude and phase signal paths.

Figure 11A:
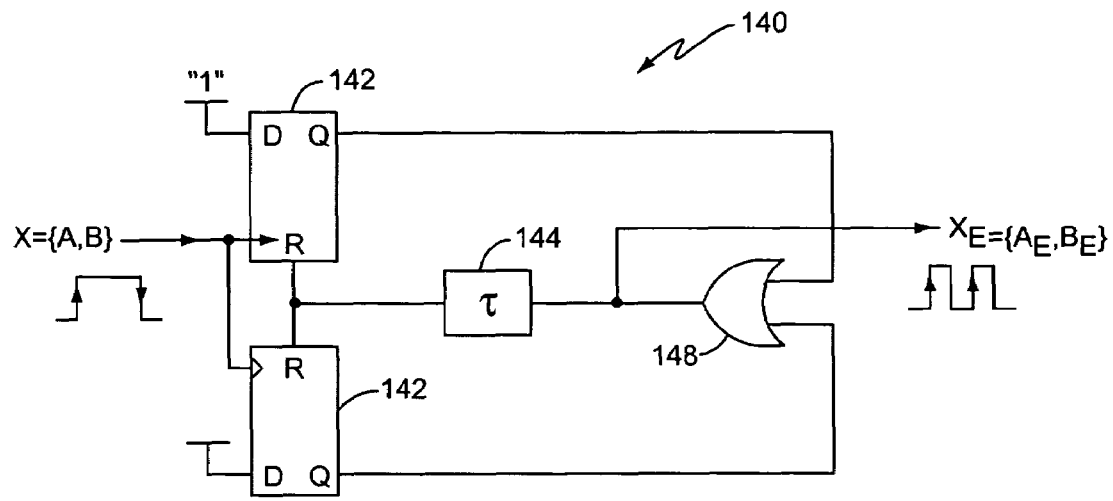
FIGS. 11A and 11B illustrate exemplary components of the early/late detector for the polar modulation transmitter of FIG. 10.
Figure 11B:
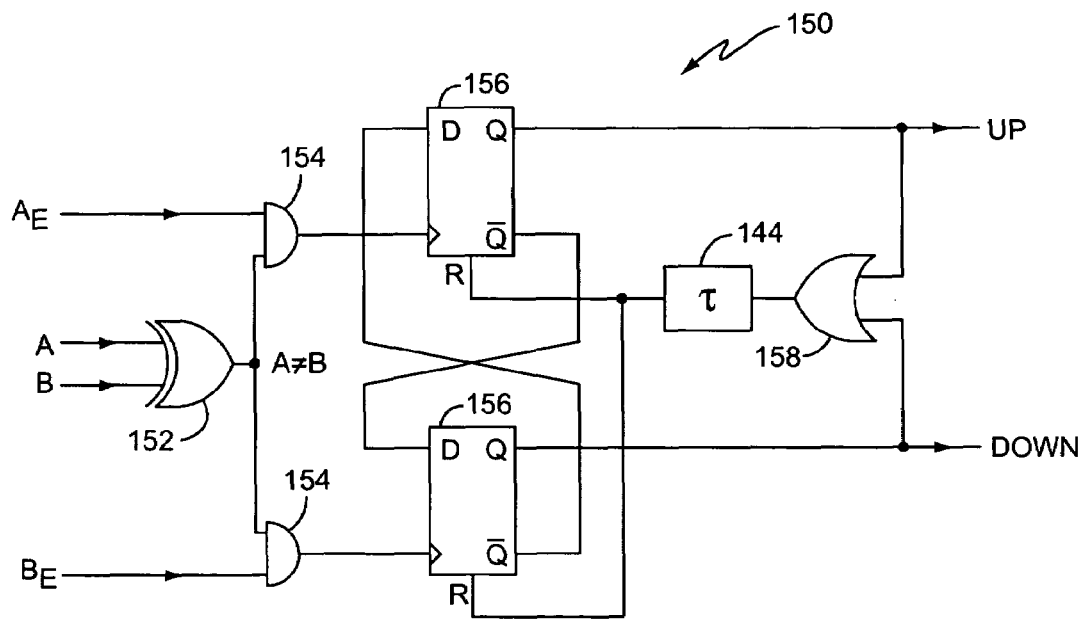

As discussed above, early/late detector 132 may comprise any known means for detecting relative signal transitions. FIGS. 11A and 11B illustrates exemplary components 140, 150 for implementing early/late detector 132. In the illustrated embodiment, early/late detector 132 comprises an edge detector 140 for each of signals A and B (FIG. 11A) and a signal generator 150 (FIG. 11B). An exemplary edge detector 140 includes two flip-flops 142, a delay element 144, and an OR-gate 148. Edge detector 140 detects transitions (level changes) on node X, where X={A, B}, resulting in a pulse of fixed duration τ on node $X_E$, where $X_E$={$A_E$, $B_E$}, and a subsequent "blind-zone" of the same duration τ. The blind-zone helps to reduce the effects of double-triggering in the presence of thermal or supply/ground noise, particularly when the comparator differential input voltages are small and hence an ambiguity in the comparator output exists.

Signal generator 150 generates a delay error signal comprising a pulse of duration T on either the UP or DN terminal, depending on whether signal A or B transitioned first. To that end, one exemplary signal generator 150, shown in FIG. 1B, comprises an XOR-gate 152, AND-gates 154, flip-flops 156, delay element 144, and OR-gate 158. To protect the proper function of the accumulator 134 or UP/DN counter connected to the output of signal generator 150, the signal generator 150 is constructed to prevent the simultaneous generation of the pulses on UP and DN. Note that the actual value of delay T is not critical to the function of the circuit as long as it is sufficiently long to avoid race conditions in the digital circuitry and sufficiently short so the blind-zone does not extend into the next transition to be detected.

As described above, accumulator 134 applies a fixed correction (G) independent of the magnitude of the delay mismatch at the input of accumulator 134 each time a pulse is detected on signal A or signal B. In order to ensure that missing pulses on either A or B have only a negligible effect on the accumulator state, and in order to provide high accuracy on the delay correction, G is typically a small number. As a result, only a small amount of delay is added to the delay correction for each detected transition. Hence, missing pulses on either the A or B signals have a negligible effect on the accumulator state and do not significantly disturb the stable state.

Beyond the missing pulse scenario, FIGS. 12A and 12B illustrate signal timing diagrams for the early/late detector 132 of FIGS. 11A and 11B for the "A shifted vs. B" and "A outside B" scenarios described above in FIGS. 9A and 9B. As shown in FIG. 12A, the output signal $A_E$ from edge detector 140 includes a pulse each time A has a transition. Similarly, the output signal $B_E$ from edge detector 140 includes a pulse each time B has a transition. When A≠B, XOR-gate 152 generates a pulse having a width equivalent to the time that A≠B. Based on a comparison between $A_E$, $B_E$, and the output of XOR-gate 152, OR-gate 158 provides the appropriate UP/DN signal to the signal generator output. For example, as shown in FIG. 12A, an UP pulse is generated at the output of signal generator 150 because the first signal A transition occurs before the first signal B transition. Similarly, because the second signal A transition also occurs before the second signal B transition, another UP pulse is generated at the output of signal generator 150. While not shown, it will be appreciated that a DN pulse is generated each time a B transition occurs before a signal A transition.

However, as illustrated in FIG. 12B, when signal B is completely contained within signal A, signal generator 150 provides a different output. As before, an UP pulse is generated when the first signal A transition occurs before the first signal B transition. However, because the second signal B transition occurs before the second signal A transition, signal generator 150 generates a DN pulse. As a result, delay tracking circuit 110 generates a net zero correction for the "A outside B" scenario. A similar result occurs for the "B outside of A" scenario.

Figure 13:
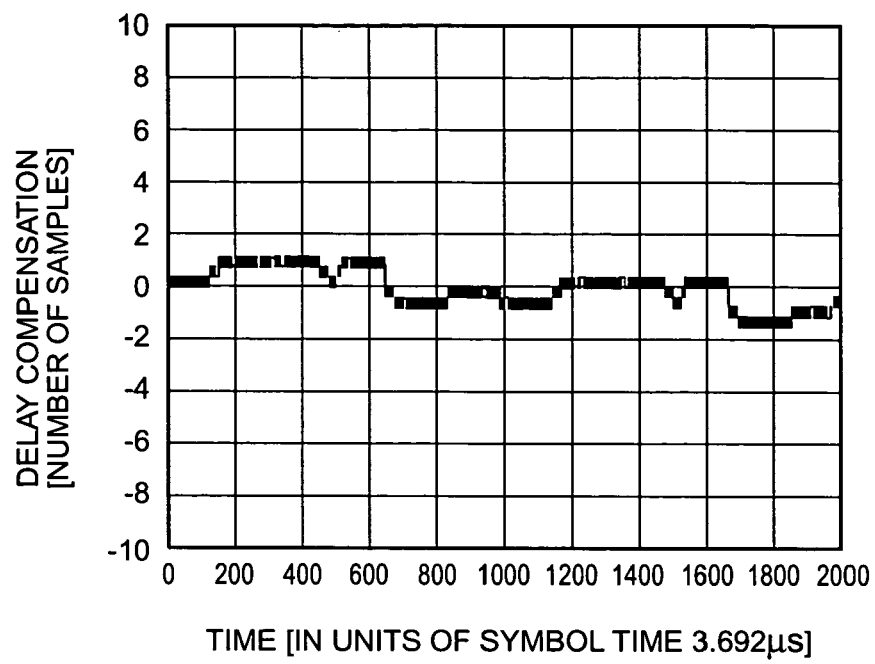
FIG. 13 illustrates typical delays output by one exemplary delay tracking circuit when the polar modulation transmitter experiences 0% delay mismatch.
Figure 14:
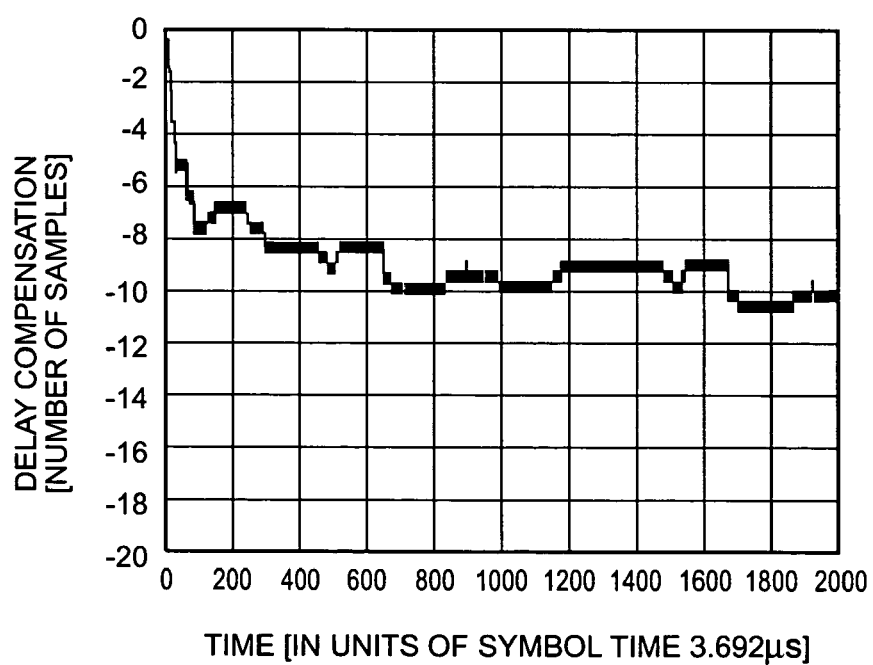
FIG. 14 illustrates typical delays output by one exemplary delay tracking circuit when the polar modulation transmitter experiences an initial 4% delay mismatch (corresponding to 10 samples).

By tracking the delay mismatch, as described above, the present invention improves the ACPR performance of the polar modulation transmitter 100. FIGS. 13 and 14 illustrate exemplary performance results for the polar modulation transmitter 100 of FIG. 10. FIG. 13 illustrates delay tracking results when regulator 26 does not contribute any significant delay, and therefore, when there is no significant delay mismatch between the amplifier input signal and the amplifier supply signal. As expected, when the accumulator 134 starts at a zero value, the accumulator state generally remains at zero throughout the simulation period. Some fluctuation is expected due to occasional missing pulses at the early/late detector input and due to the discreteness of the delay adjustment (herein 1/256-th of $T_S$). FIG. 13 confirms this behavior.

A second scenario assumes that regulator 26 causes a delay of 4% $T_s$ (corresponding to 10 samples). FIG. 14 shows that after an initial transient, the loop settles at an accumulator state corresponding to −10 samples, or −4% of $T_S$. As a result, FIG. 14 shows that delay tracking circuit 110 accurately determined the delay mismatch and provided sufficient delay to delay circuit 160 to time-align the amplifier input signal with the amplifier supply signal at the power amplifier reconstruction point.

Figure 15:
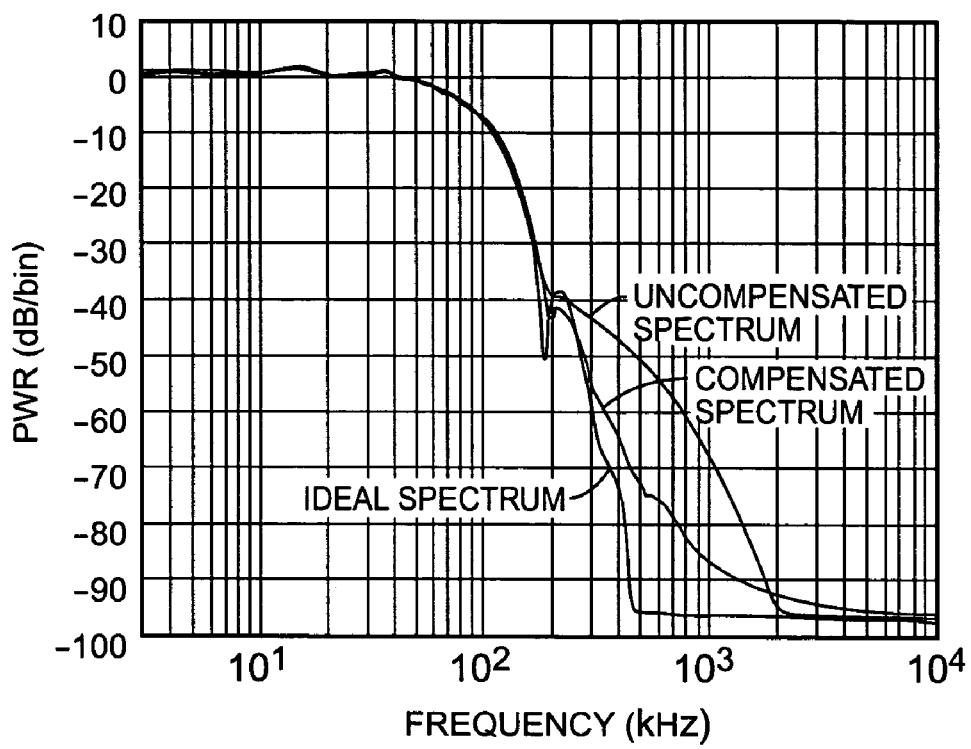
FIG. 15 illustrates the EDGE modulation spectrum with and without delay compensation as compared to the ideal EDGE modulation spectrum.

FIG. 15 further illustrates ACPR performance results of the polar modulation transmitter 100 of FIG. 10. Using the early/late detector 132 of FIGS. 10 and 11 and assuming a pre-imposed regulator delay of 10 DAC samples (4% $T_S$) and soft clipping in the regulator 26, FIG. 15 illustrates a comparison between the ideal EDGE power spectrum and the uncompensated EDGE power spectrum. As illustrated in FIG. 15, the uncompensated EDGE spectrum does not satisfy the ACPR requirements. FIG. 15 also shows the EDGE power spectrum resulting from a power amplifier output signal that included delay mismatch compensation. As shown by FIG. 15, the ACPR of the compensated EDGE spectrum has at least a 17 dB improvement, i.e., at 400 kHz, over the un-compensated spectrum because of the delay mismatch adjustment applied to the phase signals, even in the presence of soft-clipping of the regulator 26 as described before. The margin for the ACPR requirements is almost 8 dB, leaving enough headroom for other distortion mechanisms not addressed herein, e.g., power amplifier related distortion.

The above describes a delay tracking detector 110 in terms of a discrete, closed-loop delay compensation process based on the relative relationship between the A and B signal transitions. While the illustrated embodiment shows delay circuits 112, 160 delaying the digital amplitude and phase signals provided by the amplitude ΔΣ DAC 16 and the phase ΔΣ DAC 18, respectively, those skilled in the art will appreciate that delay circuits 112, 160 may be positioned in other locations in the polar modulation transmitter 100. For example, delay circuits 112, 160 may also be placed before DACs 16, 18 provided that the digital amplitude and phase signals are up-sampled to the DAC sampling rate before the delay is applied. It will be appreciated by those skilled in the art that the DACs 16, 18 following the delay circuits 112, 160 are not limited to the ΔΣ DACs, and may comprise any known DAC.

Figure 16:
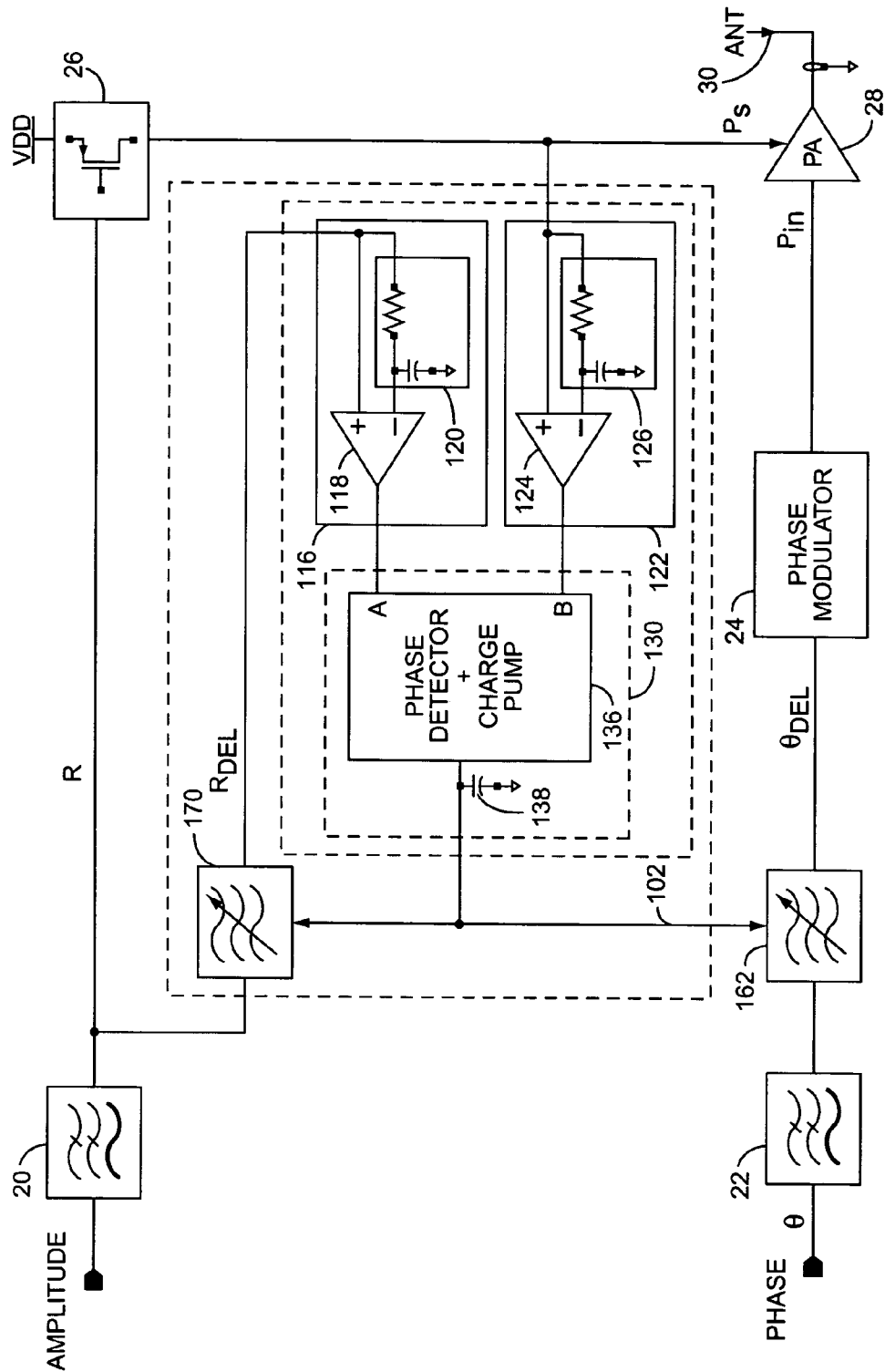
FIG. 16 illustrates a block diagram of another exemplary polar modulation transmitter according to the present invention.

Further, it will be appreciated that the present invention is not limited to the specific timing error detector 130 described above. Other implementations of timing error detector 130 and delay circuit 112, 160 may also be used. For example, FIG. 16 illustrates an alternate timing error detector 130 and delay circuit 162, 170. In the illustrated embodiment, timing error detector 130 comprises a combination phase detector and charge pump 136 and a charging circuit 138, while delay circuits 162, 170 comprise variable all pass filters 162, 170, respectively. In this embodiment, combination phase detector and charge pump 136 generates a delay error signal that issues or removes charge packets from charging circuit 138, which may comprise a capacitor, responsive to relative changes in the phase of signals A and B. The resulting capacitor voltage sets the group delay of analog delay or all-pass filters 162, 170, which in turn establishes the time alignment of the amplitude and phase signal paths.

Figure 17:
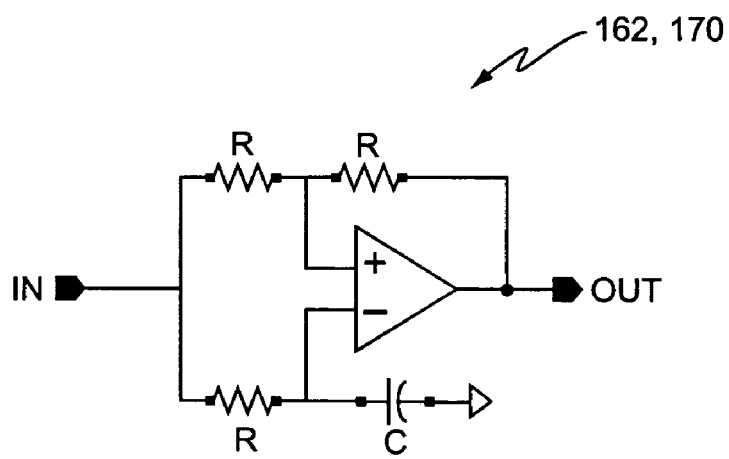
FIG. 17 illustrates one exemplary delay circuit for the polar modulation transmitter of FIG. 16.

FIG. 17 shows one exemplary implementation of the analog delay cells/all pass filters 162, 170. Filter 162, 170 has an all-pass transfer function $$H(s)=(1-s\tau_G)/(1+s\tau_G),$$

which has a magnitude of one independent of frequency and a group delay of $2\tau_G$ for frequencies well below $1/(2\pi\tau_G)$. For the frequencies of interest of the delay mismatch compensation application, the delay is practically independent of frequency, since only a small correction is necessary. The group delay is adjustable by virtue of making the time constant $\tau_G$=RC adjustable. This may be achieved by using variable MOS resistors and/or variable capacitors.

The above describes a method and apparatus that dynamically compensates for delay mismatch between an amplifier input signal and an amplifier supply signal in a polar modulation transmitter. Generally, a delay circuit applies a delay to a phase signal to compensate for differences between the delay of the phase signal path and the delay of the amplitude signal path. The applied delay is determined by tracking a delay mismatch between an amplitude signal and an amplifier supply signal. In so doing, the present invention eliminates the need for calibration steps. Further, the dynamic compensation accounts for delay mismatch variations that occur due to operating and environmental conditions. It will be appreciated that the phrases "amplitude signal" and "phase signal," as used herein, refer to the polar amplitude and phase signals anywhere along the amplitude and phase signal paths between the Cartesian-to-Polar converter 14 and the regulator 26 and phase modulator 24, respectively.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of dynamically compensating for delay mismatch between an amplifier supply signal and an amplifier input signal for a power amplifier of a polar modulation transmitter, the method comprising:
generating the amplifier input signal responsive to one or more phase signals;
generating the amplifier supply signal responsive to an amplitude signal;
delaying the amplitude signal to generate a delayed amplitude signal;
determining a delay error signal based on a comparison between the delayed amplitude signal and the amplifier supply signal;
adjusting the delay of the amplitude signal responsive to the delay error signal; and
adjusting a path delay associated with the one or more phase signals responsive to the delay error signal to compensate for the delay mismatch.

2. The method of claim 1 wherein determining the delay error signal comprises:
generating a first timing indicator based on the delayed amplitude signal;
generating a second timing indicator based on the amplifier supply signal; and
comparing the first and second timing indicators to determine the delay error signal.

3. The method of claim 2 wherein generating the first timing indicator comprises:
generating a time average of the delayed amplitude signal; and
generating the first timing indicator based on a comparison between the delayed amplitude signal and the time average of the delayed amplitude signal.

4. The method of claim 2 wherein generating the second timing indicator comprises:
generating a time average of the amplifier supply signal; and
generating the second timing indicator based on a comparison between the amplifier supply signal and the time average of the amplifier supply signal.

5. The method of claim 2 wherein comparing the first and second timing indicators comprises:
detecting a first transition of the first timing indicator;
detecting a second transition of the second timing indicator; and
determining the delay error signal based on a comparison between the first and second transitions.

6. The method of claim 5 wherein adjusting the delay comprises adjusting the delay by an amount equivalent to a difference between a time of the first transition and a time of the second transition.

7. The method of claim 5 wherein adjusting the delay comprises adding a predetermined fixed delay to a previous variable delay when the first transition occurs before the second transition.

8. The method of claim 5 wherein adjusting the delay comprises subtracting a predetermined fixed delay from a previous variable delay when the first transition occurs after the second transition.

9. The method of claim 5 wherein adjusting the delay comprises adjusting a charge on a charging circuit responsive to the comparison between the first and second transitions.

10. The method of claim 9 wherein adjusting the charge on the charging circuit comprises increasing the charge by a predetermined amount when the first transition occurs before the second transition.

11. The method of claim 9 wherein adjusting the charge on the charging circuit comprises decreasing the charge by a predetermined amount when the second transition occurs before the first transition.

12. A polar modulation transmitter to dynamically compensate for delay mismatch between an amplifier supply signal and an amplifier input signal, the polar modulation transmitter comprising:
a power amplifier;
a phase modulator to generate the amplifier input signal responsive to one or more phase signals;
a regulator to generate the ampiifier supply signal responsive to an amplitude signal;
a delay tracking circuit comprising:
a variable delay circuit to impart a variable delay to the amplitude signal to generate a delayed amplitude signal; and
a delay processor to adjust the variable delay responsive to a delay error signal generated based on a comparison between the delayed amplitude signal and the amplifier supply signal; and
a delay circuit to adjust a path delay associated with the one or more phase signals responsive to the delay error signal from the delay processor to compensate for the delay mismatch.

13. The polar modulation transmitter of claim 12 wherein the delay processor comprises:
a first timing circuit to generate a first timing indicator based on the delayed amplitude signal;
a second timing circuit to generate a second timing indicator based on the amplifier supply signal; and
a timing error detector to determine the delay error signal based on the first and second timing indicators.

14. The polar modulation transmitter of claim 13 wherein the first timing circuit comprises:
an averaging circuit to generate a time average of the delayed amplitude signal; and
a comparator to generate the first timing indicator based on a comparison between the delayed amplitude signal and the time average of the delayed amplitude signal.

15. The polar modulation transmitter of claim 13 wherein the second timing circuit comprises:
an averaging circuit to generate a time average of the amplifier supply signal; and
a comparator to generate the second timing indicator based on a comparison between the amplifier supply signal and the time average of the amplifier supply signal.

16. The polar modulation transmitter of claim 13 wherein the timing error detector comprises:
an early/late detector to generate the delay error signal based on a comparison between a first transition associated with the first timing indicator and a second transition associated with the second timing indicator; and
an accumulator to adjust the variable delay based on the delay error signal.

17. The polar modulation transmitter of claim 16 wherein the accumulator comprises a combiner circuit that adds a predetermined delay to a previous variable delay when the first transition occurs before the second transition, and subtracts the predetermined delay from the previous variable delay when the second transition occurs before the first transition.

18. The polar modulation transmitter of claim 16 wherein the accumulator comprises a charging circuit and wherein the early/late detector includes a charge pump that applies a predetermined charge to the charging circuit based on the comparison between the first and second transitions.

19. The polar modulation transmitter of claim 18 wherein the charge pump adds the predetermined charge to the charging circuit when the first transition occurs before the second transition, and wherein the charge pump removes the predetermined charge from the charging circuit when the second transition occurs before the first transition.

20. The polar modulation transmitter of claim 18 wherein the delay circuit comprises a filter having a group delay corresponding to a charge of the charging circuit, and wherein the group delay of the filter compensates for the delay mismatch between the amplifier supply signal and the amplifier input signal.

* * * * *

UNITED STATES PATENT AND TRADEMARK OFFICE
CERTIFICATE OF CORRECTION

PATENT NO. : 7,359,680 B2
APPLICATION NO. : 10/940880
DATED : April 15, 2008
INVENTOR(S) : Klemmer It is certified that error appears in the above-identified patent and that said Letters Patent is hereby corrected as shown below:

On the Title Page, Item (73), under "Assignee", in Column 1, Line 2, delete "(publ) (SE)" and insert -- (publ), Stockholm (SE) --, therefor.

In Column 1, Line 37, in Equation (1), delete " $Tx(t)=I(t)+i^*Q(t)=R(t)^*e^{i\theta(t)}$ "

and insert -- $Tx(t) = I(t) + i^*Q(t) = R(t)^* e^{i\theta(t)}$ --, therefor.

In Column 8, Line 31, delete "T" and insert -- $\tau$ --, therefor.

In Column 8, Line 40, delete "T" and insert -- $\tau$ --, therefor.

In Column 12, Line 16, in Claim 12, delete "ampiifier" and insert -- amplifier --, therefor.

In Column 12, Line 22, in Claim 12, delete "adiust" and insert -- adjust --, therefor.

Signed and Sealed this

Twenty-seventh Day of April, 2010

David J. Kappos
*Director of the United States Patent and Trademark Office*